(12) United States Patent
Janna et al.

(10) Patent No.: US 12,453,589 B2
(45) Date of Patent: Oct. 28, 2025

(54) SELF-COUNTERSINKING BONE FASTENER AND METHOD FOR COUNTERSINKING A BONE FASTENER USED IN CONNECTION WITH AN ORTHOPEDIC IMPLANT

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Sied Janna, Memphis, TN (US); Henry B. Faber, Memphis, TN (US); Nathaniel Kelley Grusin, Germantown, TN (US); Charles R. Bennett, Memphis, TN (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 86 days.

(21) Appl. No.: 18/569,442

(22) PCT Filed: Jun. 15, 2022

(86) PCT No.: PCT/US2022/033592
§ 371 (c)(1),
(2) Date: Dec. 12, 2023

(87) PCT Pub. No.: WO2022/271504
PCT Pub. Date: Dec. 29, 2022

(65) Prior Publication Data
US 2024/0261009 A1    Aug. 8, 2024

Related U.S. Application Data

(60) Provisional application No. 63/213,531, filed on Jun. 22, 2021.

(51) Int. Cl.
*A61B 17/86* (2006.01)
*A61B 17/17* (2006.01)
*A61B 17/72* (2006.01)

(52) U.S. Cl.
CPC ...... *A61B 17/8605* (2013.01); *A61B 17/1725* (2013.01); *A61B 17/725* (2013.01); *A61B 17/8635* (2013.01)

(58) Field of Classification Search
CPC ........ A61B 17/72; A61B 17/7216–725; A61B 17/7283; A61B 17/88; A61B 17/875–8894
See application file for complete search history.

(56) References Cited

U.S. PATENT DOCUMENTS

| | | | | |
|---|---|---|---|---|
| 298,427 | A | * | 5/1884 | Stone ...... F16B 35/06 411/399 |
| 1,175,665 | A | * | 3/1916 | Sweet ...... F16B 23/003 411/399 |

(Continued)

FOREIGN PATENT DOCUMENTS

| EP | 3235458 B1 * | 8/2021 | ...... A61B 17/68 |
|---|---|---|---|
| EP | 4091571 A1 * | 11/2022 | ...... A61B 34/20 |

(Continued)

OTHER PUBLICATIONS

International Search Report and Written Opinion for the International Application No. PCT/US2022/033592, mailed Sep. 30, 2022, 11 pages.

(Continued)

*Primary Examiner* — Jacqueline T Johanas
(74) *Attorney, Agent, or Firm* — KDW Firm PLLC (57) ABSTRACT

Disclosed herein is a self-countersinking bone screw and a system and a method for countersinking a bone screw or fastener used in connection with an orthopedic implant such as, for example, an intramedullary nail. The bone screw (Continued)

includes one or more cutting features configured to self-countersink the head of the screw. The system and method utilize instrumentation including a plurality of markings or indicia configured to indicate a position of the head of the screw relative to an outer surface of the patient's bone. In use, the method enables a surgeon to quickly and easily countersink one or more bone screws used to couple an IM nail to a patient's bone without requiring additional instrumentation to form a countersunk hole in the patient's bone.

15 Claims, 5 Drawing Sheets

(56) References Cited

U.S. PATENT DOCUMENTS

| | | | | |
|---|---|---|---|---|
| 1,235,626 | A * | 8/1917 | Woodward | F16B 25/0015 411/421 |
| 5,516,248 | A * | 5/1996 | DeHaitre | F16B 35/041 411/399 |
| 5,766,221 | A * | 6/1998 | Benderev | A61B 17/0644 606/232 |
| 5,816,812 | A * | 10/1998 | Kownacki | A61C 8/0022 433/173 |
| 6,290,444 | B1 * | 9/2001 | Dicke | F16B 35/065 411/188 |
| 6,306,140 | B1 * | 10/2001 | Siddiqui | A61B 17/863 606/315 |
| 6,402,757 | B1 * | 6/2002 | Moore, III | A61B 17/8883 606/86 R |
| 6,565,573 | B1 * | 5/2003 | Ferrante | A61B 17/863 606/62 |
| 7,708,738 | B2 * | 5/2010 | Fourcault | A61B 17/863 606/67 |
| 8,394,132 | B2 * | 3/2013 | Lewis | A61B 17/8635 606/309 |
| 8,936,626 | B1 * | 1/2015 | Tohmeh | A61B 17/1615 606/279 |
| 9,016,995 | B1 | 4/2015 | Janowicz et al. | |
| 9,055,986 | B1 * | 6/2015 | Whipple | A61B 17/8635 |
| 10,058,368 | B2 * | 8/2018 | Orbay | A61B 17/863 |
| 11,266,453 | B2 * | 3/2022 | Zastrozna | A61B 17/864 |
| 11,766,282 | B2 * | 9/2023 | Chambers | A61B 17/863 606/305 |
| 12,251,316 | B2 * | 3/2025 | Champagne | A61B 17/8635 |
| 2003/0028193 | A1 * | 2/2003 | Weil | A61B 17/863 606/304 |
| 2006/0025773 | A1 * | 2/2006 | Yevmenenko | A61B 17/863 606/317 |
| 2008/0262496 | A1 * | 10/2008 | Schlienger | A61B 17/7283 606/62 |
| 2009/0281581 | A1 * | 11/2009 | Berg | A61B 17/8645 606/232 |
| 2010/0069970 | A1 | 3/2010 | Lewis | |
| 2010/0094349 | A1 * | 4/2010 | Hammer | A61B 17/7035 606/279 |
| 2010/0145397 | A1 * | 6/2010 | Overes | A61B 17/8038 606/319 |
| 2011/0144703 | A1 * | 6/2011 | Krause | A61B 17/869 606/309 |
| 2013/0116693 | A1 * | 5/2013 | Nelson | A61B 17/7266 606/64 |
| 2013/0158597 | A1 * | 6/2013 | Hernandez | A61B 17/0401 606/232 |
| 2016/0089189 | A1 * | 3/2016 | Buscaglia | A61B 17/1725 606/64 |
| 2016/0278789 | A1 * | 9/2016 | Garvey | B65D 71/40 |
| 2017/0296245 | A1 * | 10/2017 | Gault | A61B 17/888 |
| 2018/0092677 | A1 * | 4/2018 | Peterson | A61B 17/844 |
| 2018/0235681 | A1 | 8/2018 | Chambers | |
| 2018/0303529 | A1 * | 10/2018 | Zastrozna | A61B 17/8635 |
| 2018/0368893 | A1 * | 12/2018 | DiVincenzo | A61B 17/1604 |
| 2019/0008567 | A1 * | 1/2019 | Barry | A61B 17/7208 |
| 2019/0008570 | A1 * | 1/2019 | Rowe | A61B 17/888 |
| 2020/0093525 | A1 | 3/2020 | Zastrozna | |
| 2021/0204991 | A1 * | 7/2021 | Epstein | A61B 17/8605 |
| 2023/0338067 | A1 * | 10/2023 | Zander | A61B 17/863 |
| 2024/0261009 | A1 * | 8/2024 | Janna | A61B 17/725 |

FOREIGN PATENT DOCUMENTS

| | | | | |
|---|---|---|---|---|
| WO | WO-02083015 A1 * | 10/2002 | | A61B 17/863 |
| WO | WO-2008017501 A1 * | 2/2008 | | A61B 17/1703 |
| WO | WO-2010062379 A1 * | 6/2010 | | A61B 17/8605 |
| WO | WO-2021051037 A1 * | 3/2021 | | A61B 17/0401 |
| WO | 2021119122 A1 | 6/2021 | | |
| WO | WO-2023183951 A2 * | 9/2023 | | A61B 17/15 |

OTHER PUBLICATIONS

Smith & Nephew—Trigen Intertan Technique—utilizing the Gold Instrument Set—Surgical Technique Brochure—dated 2015, 48 Pages.

* cited by examiner

SELF-COUNTERSINKING BONE FASTENER AND METHOD FOR COUNTERSINKING A BONE FASTENER USED IN CONNECTION WITH AN ORTHOPEDIC IMPLANT

CROSS-REFERENCE TO RELATED APPLICATIONS

This application is a National Phase filing of International Application No. PCT/US2022/033592, filed Jun. 15, 2022, which application is a non-provisional of, and claims the benefit of the filing date of, U.S. provisional patent application No. 63/213,531, filed Jun. 22, 2021, entitled "Method for Countersinking a Bone Fastener Used in Connection with an Orthopedic Implant" the entirety of each application is incorporated by reference herein.

TECHNICAL FIELD

The present disclosure relates generally to the field of orthopedics, and more particularly relates to a self-countersinking bone screw or fastener, and system and method for countersinking a bone screw or fastener used in connection with an orthopedic implant such as, for example, an intramedullary nail.

BACKGROUND

Orthopedic implants are well known and commonplace in today's society. Orthopedic implants may be used, for example, to stabilize an injury, to support a bone fracture, to fuse a joint, and/or to correct a deformity. Orthopedic implants may be attached permanently or temporarily, and may be attached to the bone at various locations, including implanted within a canal or other cavity of the bone, implanted beneath soft tissue and attached to an exterior surface of the bone, or disposed externally and attached by fasteners such as screws, pins, and/or wires. Some orthopedic implants allow the position and/or orientation of two or more bone pieces, or two or more bones, to be adjusted relative to one another.

Figure 1:
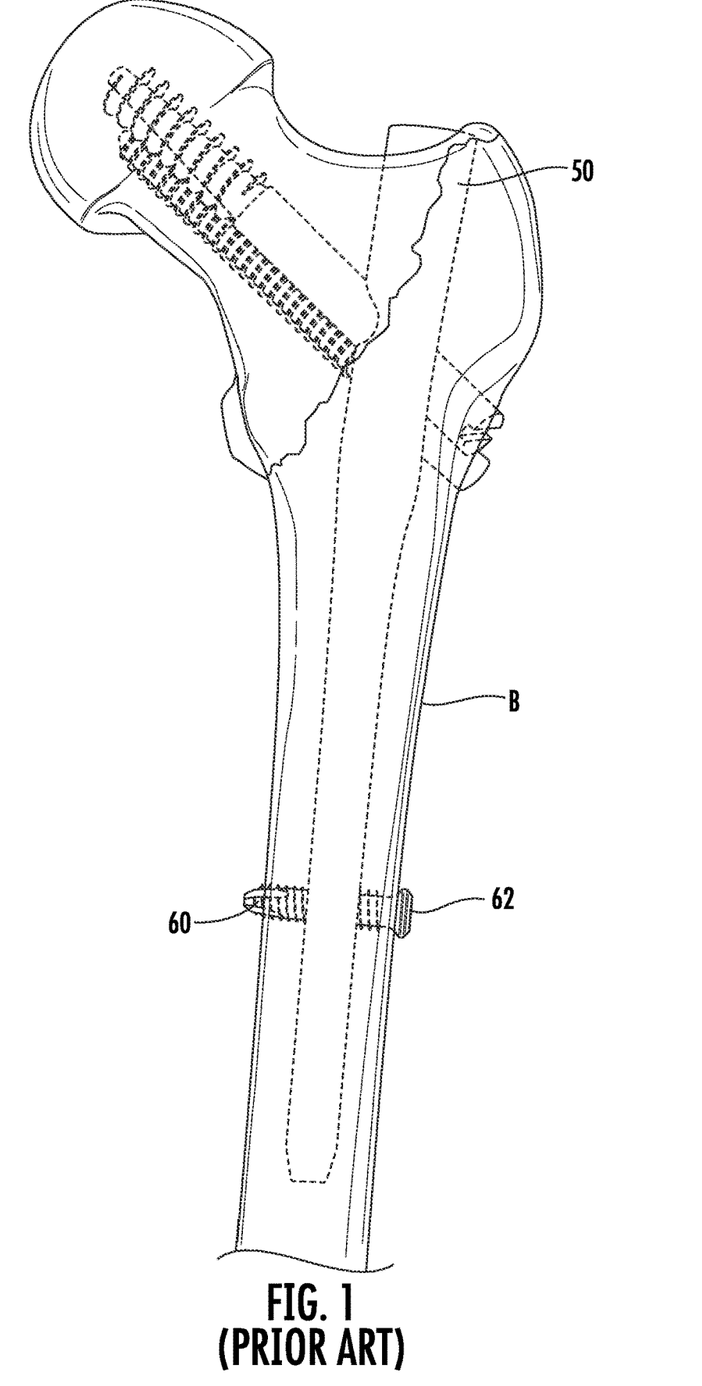
FIG. 1 illustrates a perspective view of a conventional intramedullary nail implanted within a patient's bone.

Referring to FIG. 1, an intramedullary ("IM") nail 50 is one type of orthopedic implant. The primary function of the IM nail 50 is to stabilize the fracture fragments of the patient's bone B, and thereby enable load transfer across the fracture site while maintaining anatomical alignment of the bone B. Currently, there are a large number of different commercially available IM nails in the marketplace.

One disadvantage associated with orthopedic implants (e.g., IM nail 50) is screw promulgation. That is, as illustrated, a head 62 of a bone screw 60 used to couple the IM nail 50 to the patient's bone B extends away or out from the patient's bone B and/or IM nail 50. Post-implantation, screw promulgation may lead to tissue irritation, which may cause some patient's to seek a second surgery to remove the implanted screw. In connection with implantation of IM nails, one or more screws are inserted into a patient's bone and through one or more screw openings formed in the IM nail. Post-implantation, it is not uncommon for the head of the screws to stick out or extend from the patient's bone, which may lead to irritation and a second surgery to remove the screws.

One solution to eliminate, or at least minimize, screw promulgation is to countersink the bone screw. For example, it is known to pre-drill a countersink hole in the patient's cortex to countersink the head of the bone screw so that the head of the bone screw is flush with the patient's cortex. However, pre-drilling countersink holes in the patient's cortex requires additional instrumentation and steps. As a result, surgeons often don't undertake the necessary steps and time to pre-drill the patient's cortex to enable countersinking of the bone screws.

It is with this in mind that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a self-countersinking bone screw. In one embodiment, the bone screw includes a distal end portion, an intermediate shaft portion, a neck portion, an enlarged head portion, an external thread, and one or more cutting flutes extending from the enlarged head portion towards the distal end portion. The neck portion includes a distal end and a proximal end, the neck portion configured to provide a transition from the shaft portion to the enlarged head portion, the neck portion including a minor outer diameter that tapers from a minor outer diameter of the shaft portion towards the enlarged head portion. The one or more cutting flutes include a distal end and a proximal end, the distal end of the cutting flute being positioned closer to the distal end portion of the bone screw than the distal end of the neck portion so that, in use, the distal end of the one or more cutting flutes contacts a patient's bone prior to the distal end of the neck portion.

In one embodiment, the one or more cutting flutes extend parallel to a longitudinal axis of the bone screw.

In one embodiment, the one or more cutting flutes are first and second diametrically opposed cutting flutes.

In one embodiment, the neck portion includes a tapered outer surface arranged and configured so that a minor diameter of the neck portion is smaller adjacent to the shaft portion than a minor diameter of the neck portion adjacent to the enlarged head portion.

In one embodiment, the tapered outer surface is configured as a linear taper.

In one embodiment, the external thread is a continuous thread that extends from the distal end portion through the shaft portion and into the neck portion.

In one embodiment, the neck portion includes an enlarged diameter thread such that a height of the external thread in the neck portion is greater than a height of the external thread in the shaft portion.

In one embodiment, the distal end portion includes an increased diameter thread such that a height of the external thread in the distal end portion is greater than a height of the external thread in the shaft portion.

In one embodiment, the distal end portion includes a tapered nose.

In one embodiment, the enlarged head portion includes a distal end, a proximal end, and a concave outer surface extending from the distal end toward the proximal end.

Disclosed herein is a method for countersinking a bone fastener to secure an orthopedic implant (e.g., an IM nail) to a patient's bone. In one embodiment, the method includes implanting an IM nail within an intramedullary canal of a patient's bone; targeting, locating, determining, etc. a first screw opening formed in the implanted IM nail; predrilling a first screw hole in the patient's bone; and inserting a first bone screw into the first screw hole formed in the patient's bone and into the first screw opening formed in the IM nail; wherein inserting the first bone screw into the first screw hole comprises rotating a head portion of the first bone screw until the head portion of the bone screw is inserted to a depth sufficient such that an uppermost surface of the head portion is countersunk and wherein inserting the first bone screw into the first screw hole does not include pre-drilling a countersunk hole.

In one embodiment, the method further includes monitoring a position of the head portion of the first bone screw, and inserting the first bone screw until the head portion is positioned flush with an outer surface of the patient's bone (e.g., proximal end surface of the head portion is flush with the outer surface of the patient's bone).

In one embodiment, the first bone screw includes a threaded shaft and an enlarged head portion, the enlarged head portion including one or more cutting features (e.g., cutting flutes) arranged and configured to form the countersunk hole in the patient's bone.

In one embodiment, the one or more cutting features (e.g., cutting flutes) are arranged and configured to enlarge or increase a diameter of the first screw hole formed in the patient's bone so that the enlarged head portion can be inserted to a depth sufficient such that an uppermost surface of the enlarged head portion is positioned beneath the outer surface of the patient's bone.

In one embodiment, inserting a first bone screw into the first screw hole formed in the patient's bone and into engagement with a first screw opening formed in the IM nail comprises coupling a guide to the IM nail, inserting a sleeve into the guide, and coupling the first bone screw to a screwdriver. The screwdriver including a plurality of markings or indicia to indicate a position of the enlarged head portion of the bone screw relative to the outer surface of the patient's bone.

In one embodiment, the plurality of markings or indicia include a first marking or indicia, a second marking or indicia, and a third marking or indicia.

In one embodiment, the first marking or indicia is arranged and configured to indicate that the enlarged head portion of the bone screw is approaching the outer surface of the patient's bone. The second marking or indicia is arranged and configured to indicate that the enlarged head portion of the bone screw is in contact with the outer surface of the patient's bone. The third marking or indicia is arranged and configured to indicate that the enlarged head portion of the bone screw is countersunk or at a penetration depth flush with or near (e.g., slightly above or below) the outer surface of the patient's bone.

In one embodiment, the method may be repeated as needed to insert a second bone screw into the patient's bone and into engagement with the IM nail.

Embodiments of the present disclosure provide numerous advantages. In one non-limiting example advantage, a self-countersinking bone screw or fastener is provided. The self-countersinking bone screw or fastener being arranged and configured to self-countersink into the patient's bone to avoid, or at least minimize, screw promulgation. The bone screw or fastener being arranged and configured to self-countersink without the need for any separate instrumentation, tools, or steps. In addition, the method enables a surgeon to quickly and easily countersink a bone screw or fastener into a patient's bone without the need for extra steps or instrumentation such as, for example, without the need to countersink a pre-drilled pilot hole formed in the patient's bone (e.g., surgeon does not need to use additional instrumentation to enlarge the pilot hole to countersink the head portion of the bone screw or fastener).

Further features and advantages of at least some of the embodiments of the present invention, as well as the structure and operation of various embodiments of the present invention, are described in detail below with reference to the accompanying drawings.

BRIEF DESCRIPTION OF THE DRAWINGS

By way of example, a specific embodiment of the disclosed device will now be described, with reference to the accompanying drawings, in which.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein. In the drawings, like numbers refer to like elements throughout unless otherwise noted.

DETAILED DESCRIPTION

Various features or the like of a self-countersinking bone screw or fastener (terms used interchangeably herein without the intent to limit or distinguish) along with a system and a method for countersinking a bone screw used in connection with an orthopedic implant such as, for example, an intramedullary ("IM") nail will now be described more fully hereinafter with reference to the accompanying drawings, in which one or more features of the bone screw, system, and method will be shown and described. It should be appreciated that the various features may be used independently of, or in combination, with each other. For example, the bone screw may be used independently and separately from the system and method. Similarly, the system and method may be used independently and separately from the bone screw. In addition, it will be appreciated that the bone screw, system, and method as disclosed herein may be embodied in many different forms and should not be construed as being limited to the embodiments set forth herein. Rather, these embodiments are provided so that this disclosure will convey certain features to those skilled in the art.

As will be described herein, in accordance with one or more features of the present disclosure, a self-countersinking bone screw will be shown and described. In addition, in accordance with one or more features of the present disclosure, the system and method for countersinking a bone screw will be shown and described in connection with implantation of an intramedullary nail. However, the present disclosure should not be so limited and the bone screw, system, and method may be used in connection with other orthopedic implants.

Figure 2A:
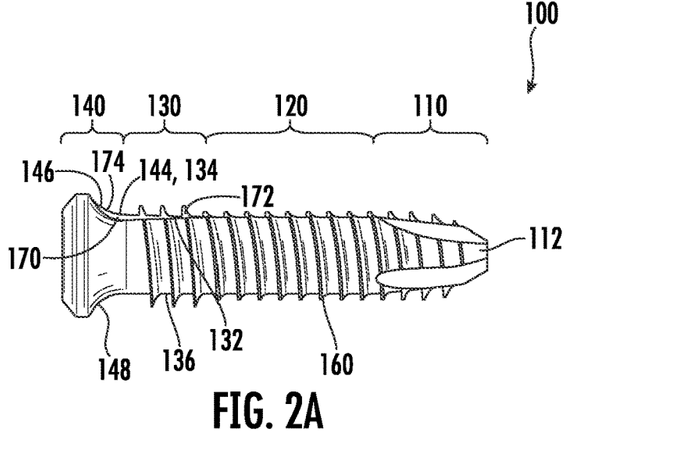
FIGS. 2A-2C illustrate various views of an embodiment of a bone screw or fastener in accordance with one or more features of the present disclosure, the bone screw or fastener may be used in connection with an embodiment of a method for countersinking a bone screw or fastener used in combination with an orthopedic implant in accordance with one or more features of the present disclosure.
Figure 2B:
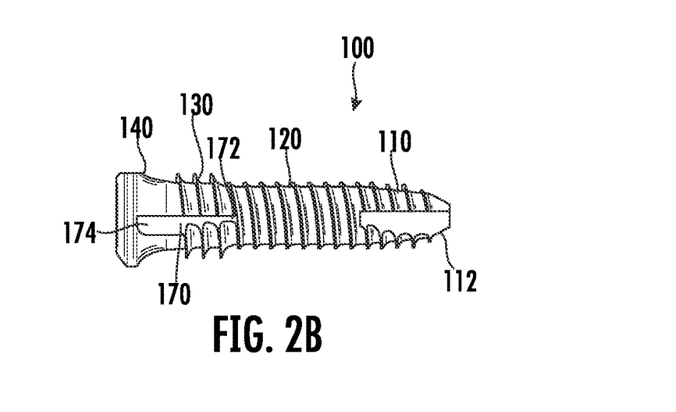
Figure 2C:
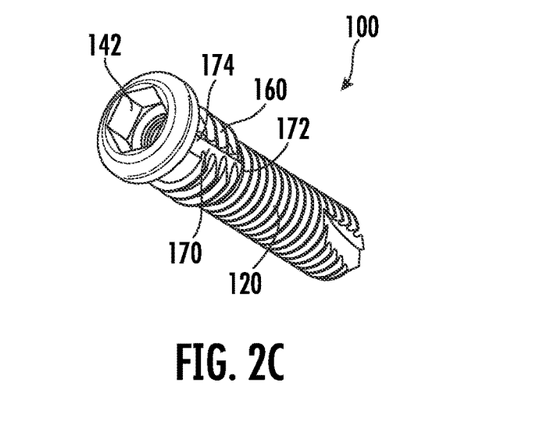

In accordance with one or more features of the present disclosure, an embodiment of a bone screw is disclosed. Referring to FIGS. 2A-2C, the bone screw 100 includes one or more features arranged and configured to self-countersink (e.g., to form a countersink hole). That is, the bone screw 100 includes one or more features to form a countersink hole in the patient's bone without the need for a separate countersinking drilling step.

As illustrated, the bone screw 100 includes a distal end portion 110, an intermediate shaft portion 120, a neck portion 130, and an enlarged head portion 140. In addition, the bone screw 100 includes external threads 160. As will be readily appreciated by one of ordinary skill in the art, the enlarged head portion 140 includes a driver mechanism 142 for engaging a surgical instrument such as, for example, a screwdriver or hex driver as will be disclosed in greater detail below. In use, the driver mechanism 142 may be any suitable mechanism for engaging a corresponding tool such as, for example, a hex, a Philips or straight slot for coupling with a corresponding screwdriver, etc. As illustrated, in one embodiment, the enlarged head portion 140 includes a distal end 144, a proximal end 146, and a concave outer surface 148 extending from the distal end 144 toward the proximal end 146. In use, the concave outer surface 148 is configured to provide increased tactile feedback to the surgeon thereby eliminating the need for visualization to determine when the bone screw 100 is fully seated. In addition, by providing a bone screw having an enlarged head portion with a concave outer surface, the possibility that the bone cracks or that the head of the bone screw is seated sub-flushed due to lack of tactile seating feel as compared to a bone screw having an enlarged head portion with a tapered outer surface (e.g., a wedge-shaped profile) is minimized (e.g., in use, in hard (i.e., diaphyseal) bone, a tapered or wedge-shaped profile can possibly lead to cracking when the screw is seated, in soft (i.e., metaphyseal) bone, a tapered or wedge-shaped profile can possibly lead to seating the screw sub-flush). By providing a bone screw with an enlarged head portion having a concave outer surface, the concave shape or profile of the head minimizes the cracking and sub-flush issues. In addition, the enlarged head portion offers the surgeon additional tactile seating feedback when used in soft bone.

As illustrated, in one embodiment, the neck portion 130 provides a transition from the shaft portion 120 to the enlarged head portion 140. In one embodiment, the neck portion 130 is arranged and configured with a minor outer diameter that tapers from a minor outer diameter of the shaft portion 120 toward the enlarged head portion 140 (e.g., the minor outer diameter of the neck portion 130 tapers from the minor outer diameter of the shaft portion 120 to the start of the concave outer surface 148 of the enlarged head portion 140). That is, the neck portion 130 may include a distal end 132, a proximal end 134, and a tapered outer surface 136. In use, the tapered outer surface 136 is arranged and configured so that the minor diameter of the neck portion 130 (e.g., diameter of the neck portion 130 without the external threads 160) is smaller adjacent to the shaft portion 120 as compared to the minor diameter of the neck portion 130 adjacent to the enlarged head portion 140. In one embodiment, the tapered neck portion 130 may be configured as a linear taper, however this is one configuration and the taper may be curved.

In accordance with one or more features of the present disclosure, the bone screw 100 includes one or more cutting flutes, cutting features, cutting grooves, or the like 170 (terms used interchangeably herein without the intent to distinguish). As illustrated, in one embodiment, the cutting flutes 170 extend longitudinally (e.g., the cutting flutes 170 are arranged and configured parallel to a longitudinal axis of the bone screw 100). In one embodiment, the bone screw 100 may include a pair (e.g., first and second) diametrically opposed cutting flutes 170, although this is one configuration and the bone screw 100 may include any number of cutting flutes 170 including, one, three, four, or more. While the cutting flutes 170 are shown and described as being parallel to the longitudinal axis of the bone screw 100, alternate configurations are envisioned. For example, it is envisioned that the cutting flutes 170 may be aligned perpendicular or at an angle with respect to the longitudinal axis of the bone screw 100. In use, the one or more cutting flutes 170 may be provided in any suitable form arranged and configured to cut or enlarge the patient's bone B during insertion (e.g., rotation) of the enlarged head portion 140 of the bone screw 100 into the patient's bone B.

In one embodiment, as illustrated, the cutting flutes 170 extend from the enlarged head portion 140 to the neck portion 130. That is, in one embodiment, the cutting flutes 170 have a distal end 172 and a proximal end 174. The distal end 172 of the cutting flute 170 preferably commences, starts, is positioned, etc. distally of the commencement of the tapered outer surface 136 formed in the neck portion 130. Meanwhile, the proximal end 174 of the cutting flutes 170 extend into a distal portion of the enlarged head portion 140. Thus arranged, by extending the cutting flutes 170 into the enlarged head portion 140, the bone screw 100, and more specifically, the enlarged head portion 140, is able to sit or rest further into the patient's bone thus enabling improved countersinking. In addition, by configuring the cutting flute 170 to commence prior to the tapered neck portion 130, the distal end 172 of the cutting flute 170 is configured to contact, engage, etc. the patient's bone prior to the tapered necked portion 130.

As previously mentioned, the bone screw 100 includes external threads 160. In one embodiment, as illustrated, the external thread 160 may be a continuous thread that extends from the distal end portion 110 through the shaft portion 120 and into and/or through the neck portion 130. In one embodiment, the neck portion 130 may include an enlarged diameter thread. That is, as measured from the minor diameter of the outer surface of the bone screw 100 (e.g., difference between major diameter and minor diameter), the diameter or height of the external thread 160 in the neck portion 130 may be greater than the diameter or height of the external thread 160 in the shaft portion 120. Thus arranged, the increased height of the external thread 160 in the neck portion 130 is configured to provide increased purchase of the bone screw 100 into the patient's bone.

In addition, and/or alternatively, in one embodiment, the distal end portion 110 may include an increased diameter thread. That is, in one embodiment, as measured from the minor diameter of the outer surface of the bone screw 100 (e.g., difference between major diameter and minor diameter), the diameter or height of the external thread 160 in the distal end portion 110 may be greater than the diameter or height of the external thread 160 in the shaft portion 120. Thus arranged, the increased height of the external thread 160 in the distal end portion 110 is configured to provide increased purchase of the bone screw 100 into the patient's bone, especially into the far cortex of the patient's bone when used in combination with an intramedullary nail as will be described below.

In one embodiment, as illustrated, the distal end portion 110 includes a tapered nose 112. In use, by providing a tapered nose 112 with a smaller diameter distal end, the bone screw 100 is arranged and configured to provide increased likelihood of locating the pre-drill hole formed in the patient's far cortex (e.g., tapered nose 112 mitigates the risk of screw mitigation during insertion through the near cortex of the patient's bone through the hole formed in the implant (e.g., IM nail) and into the far cortex). Thus arranged, in use, the tapered distal nose 112 reduces the likelihood of an agoraphobia fracture.

In addition, in use, the bone screw 100 is configured to be self-tapping. However, the bone fastener 100 is not self-drilling. As such, in one embodiment, during use, a pilot hole is initially formed in the patient's bone. In one embodiment, the pilot hole is appropriately sized so that the diameter of the pilot hole is the same, or substantially the same, to slightly bigger than the minor diameter of the shaft portion 120. Thus, for example, in one embodiment, the shaft portion 120 may have a minor diameter of 4.2 mm and a major diameter of 5.0 mm. The corresponding pilot hole may be formed with a diameter between 4.2 mm to 4.5 mm. The neck portion 130 may have a minor diameter of 4.2 mm and a major diameter of 5.8 mm thus illustrating the increased diameter threads formed in the neck portion 130 as compared to the shaft portion 120.

Thus arranged, in accordance with features of the present disclosure, the bone screw 100 is arranged and configured to form a countersink hole in the patient's bone B without the need for any separate instrumentation or tools. Thus arranged, the bone screw 100 may include an enlarged head portion 140 that is arranged and configured to sit flush against the patient's bone thereby avoiding, or at least minimizing, screw promulgation without the need for additional countersinking steps (e.g., proximal end surface of the head portion is arranged and configured to sit flush against the patient's bone).

In use, the cutting flutes 170 are arranged and configured to enlarge or increase a diameter of the screw hole formed in the patient's bone B formed by the shaft portion 120 so that continued rotation of the bone screw 100 causes the bone screw 100 to penetrate into the patient's bone B to a depth sufficient such that the uppermost surface of the enlarged head portion 140 is flush with the surface of the patient's bone (e.g., cortex). As such, the enlarged head portion 140 may be positioned at or near an outer surface of the patient's bone B.

In use, in accordance with the features of the present disclosure, the bone screw 100 has been shown to provide increased bone purchase. As such, the bone screw 100 may be implanted within metaphyseal and diaphyseal bone. In addition, the bone screw 100 is configured so that when properly seated in use, screw head promulgation is minimized, the bone screw 100 is configured to prevent, or at least minimize, the risk of cracking hard diaphyseal bone, and the surgeon can feel when the bone screw 100 is fully seated without visualization even when the bone screw is used in metaphyseal bone.

It should be appreciated that while a particular bone screw has been illustrated and described, the present disclosure is not so limited and any suitable bone screw may be utilized.

In accordance with one or more features of the present disclosure, a system and method for countersinking a bone screw to secure an orthopedic implant (e.g., an IM nail) to a patient's bone is disclosed. In one embodiment, the system and method includes one or more self-countersinking bone screws such as, for example, bone screw 100 previously described. In use, the orthopedic implant may be an IM nail, although other implants are envisioned.

Figure 3A:
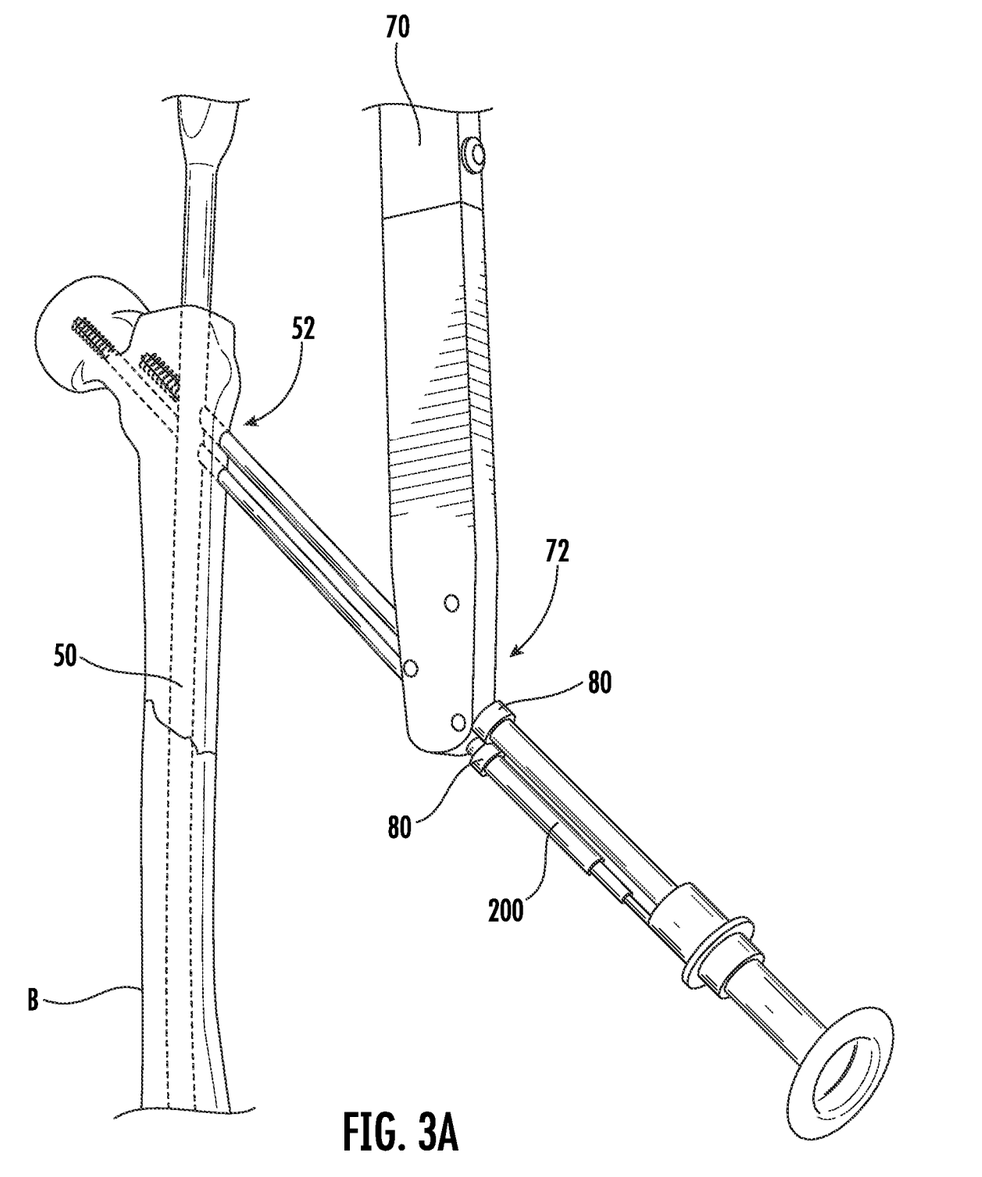
FIG. 3A illustrates a side view of various instruments being used to target one or more screw openings formed in an IM nail, the instruments including a guide and a sleeve.

Referring to FIG. 3A, during implantation of an IM nail 50, a number of various components, instruments, or tools (terms used interchangeably herein without the intent to distinguish) can be utilized to assist surgeons with implantation of the IM nail 50. For example, a guide 70 may be used to implant the IM nail 50 and to target one or more screw openings 52 formed in the IM nail 50. In addition, a screwdriver, a hex driver, etc. (terms used interchangeably herein without the intent to distinguish) may be used to implant a screw such as, for example, bone screw 60 or bone screw 100. In one embodiment, the hex driver and the bone screw coupled thereto may be inserted into a sleeve (e.g., a drill sleeve) 80 positioned within an opening formed 72 in the guide 70. The hex driver may include a proximal end, a distal end, and an intermediate body portion extending between the proximal and distal ends. The intermediate body portion may include a marking or indicia thereon. In use, the bone screw may be inserted until the marking or indicia on the hex driver is aligned with the back or distal end of the sleeve 80 indicating that the head of the bone screw is approaching the outer surface of the patient's cortex. Thus arranged, the marking or indicia assists surgeons with identifying the positioning of the bone screw to avoid over-penetration.

Figure 3B:
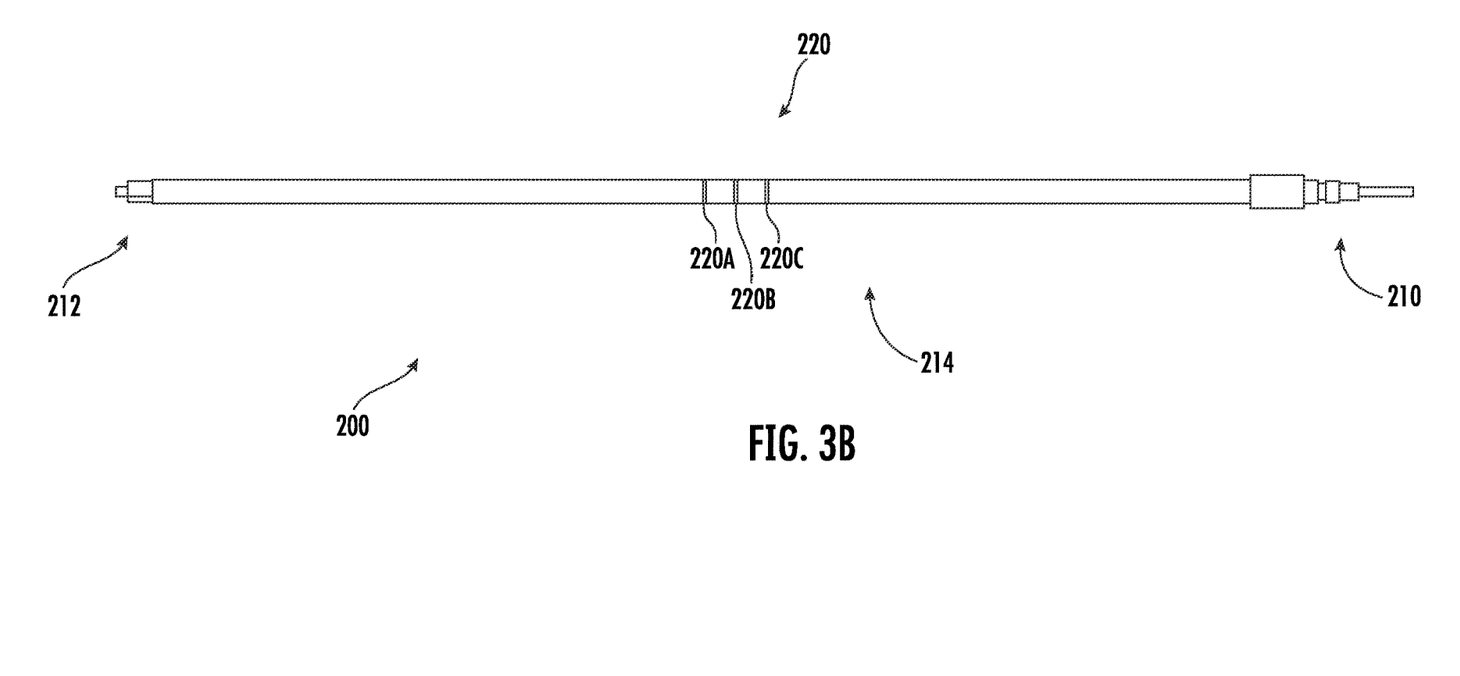
FIG. 3B illustrates a side view of an embodiment of a screwdriver that may be used in connection with the guide and the sleeve shown in FIG. 3A in accordance with one or more features of the present disclosure.

In accordance with one or more features of the present disclosure, as illustrated in FIG. 3B, the hex driver 200 may include a plurality of markings or indicia 220 located thereon. That is, as illustrated, the hex driver 200 includes a proximal end 210, a distal end 212, and an intermediate body portion 214 extending between the proximal and distal ends 210, 212. In use, the intermediate body portion 214 includes a plurality of markings or indicia 220 spaced apart from each other to indicate various bone screw penetration depths. For example, in one embodiment and as illustrated, the intermediate body portion 214 may include a first marking or indicia 220A, a second marking or indicia 220B, and a third marking or indicia 220C. In use, the first marking or indicia 220A may indicate when the head of the bone screw is approaching the outer surface of the patient's bone B (e.g., the first marking or indicia 220A may indicate when the head of the bone screw is approximately 1 mm away from the outer surface of the patient's bone). As such, the first marking or indicia 220A may be used by the surgeon to indicate when the head of the bone screw is approaching the patient's bone and additional care should be taken. For example, the surgeon may desire to switch from a powered screwdriver to manual rotation.

The second marking or indicia 220B may indicate when the head of the bone screw is in contact with the outer surface of the patient's bone B. The third marking or indicia 220C may indicate a countersink or penetration depth (e.g., the third marking or indicia 220C may indicate, for example, that the head of the bone screw has been countersunk 1 mm into or beneath the outer surface of the patient's bone B). As will be appreciated by one of ordinary skill in the art, the number and positioning/indications of the markings or indicia 220 are but one example and other embodiments are envisioned. For example, the hex driver may include four, five, or more markings or indicia. In one embodiment, the additional markings or indicia may indicate additional countersunk or penetration depths.

Figure 4:
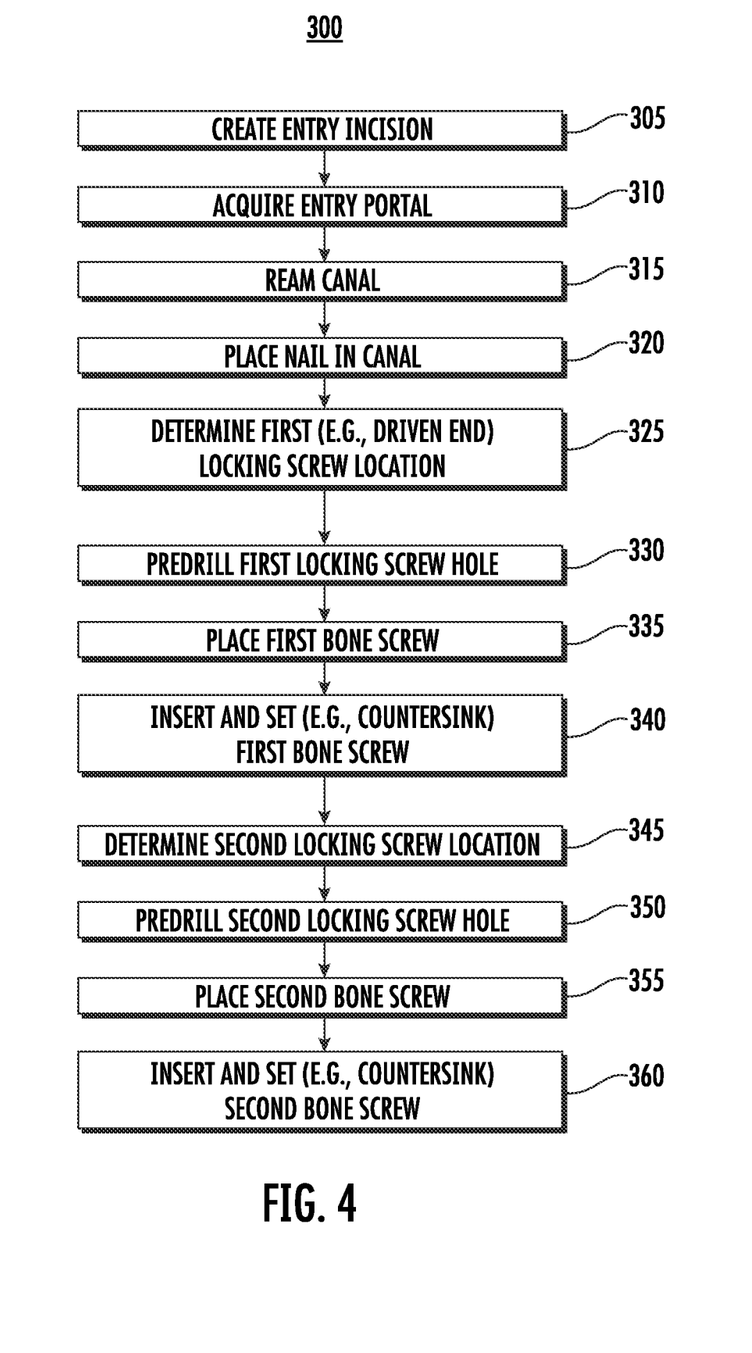
FIG. 4 illustrates a flowchart of an embodiment of a method for countersinking a bone screw or fastener used in combination with an orthopedic implant in accordance with one or more features of the present disclosure.

Referring to FIG. 4, in accordance with one or more features of the present disclosure, an embodiment of a method 300 for countersinking a bone screw to secure an IM nail within a patient's bone is shown. For example, as will be described herein, in use, the method 300 may utilize the bone screw 100 described in connection with FIGS. 2A-2C and the screwdriver or hex driver 200 described in connection with FIG. 3B to insert and countersink the enlarged head portion 140 of the bone screw 100 into the patient's bone B.

As illustrated, the method 300 includes implanting the IM nail (e.g., IM nail 50) within an intramedullary canal of a patient's bone B. For example, as illustrated, the method includes, at 305, creating an incision to access the patient's bone B and, at 310, forming an entry portal to the patient's bone B. Next, at 315, the intramedullary canal of the patient's bone B is reamed to receive the IM nail 50 and, at 320, the IM nail 50 is inserted into the intramedullary canal of the patient's bone B. Next, at 325, a first screw opening formed in the implanted IM nail 50 is located. For example, a screw opening formed in a proximal or driven end of the IM nail 50 may be located using any suitable mechanism or means now known or hereafter developed. Thereafter, at 330, once the first screw opening formed in the implanted IM nail 50 has been located, the surgeon may predrill the screw hole in the patient's bone B to access the first screw opening formed in the IM nail. That is, for example, the surgeon may drill a pilot hole into the near and far cortex of the patient's bone to receive the bone screw 100.

Thereafter, at 335, in accordance with one or more features of the present disclosure, a bone screw including one or more cutting features such as, for example, bone screw 100 may be inserted into the patient's bone B. Thus arranged, once the head portion 140 of the bone screw 100 reaches the patient's bone B, the cutting flutes 170 and/or the tapered neck portion 130 enlarge or increase a diameter of the screw hole (e.g., pilot hole formed in the near cortex) formed in the patient's bone B formed by the shaft portion 120 of the bone screw 100 so that the enlarged head portion 140 can be inserted into the patient's bone B to a depth sufficient such that the uppermost, proximal surface of the enlarged head portion 140 is flush with the outer surface of the near cortex of the patient's bone (e.g., the enlarged head portion 140 may be positioned at or near an outer surface of the patient's bone B).

For example, in one embodiment, as described in connection with FIGS. 3A and 3B, the placement of the bone screw 100 may include coupling a guide 70 to an IM nail 50 to target the screw opening 52 formed in the IM nail 50. Thereafter, a sleeve (e.g., a drill sleeve) 80 may be positioned within an opening 72 formed in the guide 70 and a drill may be utilized to form the screw hole (e.g., pilot hole) in the patient's bone B. Next, utilizing markings on the guide and drill, the depth of the patient's bone B may be determined.

In accordance with one or more features of the present disclosure, at 340, the bone screw 100 may be coupled to a screwdriver such as, for example, hex driver 200, and may be inserted utilizing the guide 70 and the sleeve 80. The hex driver 200 and bone screw 100 may be inserted until the first marking or indicia 220A is aligned with the back or distal end of the sleeve 80 indicating that the enlarged head portion 140 of the bone screw 100 is approaching the outer surface of the patient's bone B (e.g., when the enlarged head portion 140 of the bone screw 100 is approximately 1 mm away from the outer surface of the patient's bone B). Next, the hex driver 200 may be further rotated such as, for example, manually rotated, until a second marking or indicia 220B on the hex driver 200 is aligned with the back or distal end of the sleeve 80 indicating that the enlarged head portion 140 of the bone screw 100 is in contact with the outer surface of the patient's bone B. Thereafter, the hex driver 200 may be further rotated such as, for example, manually rotated, until a third marking or indicia 220C on the hex driver 200 is aligned with the back or distal end of the sleeve 80 indicating that the enlarged head portion 140 of the bone screw 100 is countersink or achieved a penetration depth (e.g., the third marking or indicia 220C may indicate, for example, that the enlarged head portion 140 of the bone screw 100 has been countersunk 1 mm into or beneath the outer surface of the patient's bone B). Thus arranged, the surgeon is easily able to countersink the bone screw 100 without additional instrumentation.

With continued reference to FIG. 4, the method 300 may be repeated to insert a second bone screw such as, for example, a distal bone screw into a distal screw opening formed in the distal end of the IM nail. For example, as illustrated, the method includes, at 345, determining or targeting a screw opening formed in a distal or leading end of the IM nail. Thereafter, at 350, once the screw opening formed in the implanted IM nail has been located, the surgeon may predrill the screw hole (e.g., pilot hole) in the patient's bone B. Thereafter, at 355 and 360, as previously described, a second bone screw including one or more cutting features (e.g., cutting flutes) may be inserted into the patient's bone B until the head of the bone screw is inserted into the patient's bone to a depth sufficient such that the uppermost, proximal surface of the head is flush with the surface of the cortex of the patient's bone (e.g., the enlarged head portion 140 may be positioned at or near an outer surface of the patient's bone).

Thus arranged, in accordance with one or more features of the present disclosure, the system and method enables a surgeon to eliminate, or at least minimize, screw promulgation by enabling the surgeon to quickly and easily countersink the bone screw into the patient's cortex without requiring additional steps or instrumentation. For example, the needed instrumentation and steps to pre-drilling a countersink hole in the patient's cortex to countersink the head of the screw is eliminated.

The foregoing description has broad application. While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments. Rather these embodiments should be considered as illustrative and not restrictive in character. All changes and modifications that come within the spirit of the disclosure are to be considered within the scope of the disclosure. The present disclosure should be given the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counter-clockwise) and the like may have been used herein. Such directional references are only used for identification purposes to aid the reader's understanding of the present disclosure. For example, the term "distal" may refer to the end farthest away from the medical professional/operator when introducing a device into a patient, while the term "proximal" may refer to the end closest to the medical professional when introducing a device into a patient. Such directional references do not necessarily create limitations, particularly as to the position, orientation, or use of this disclosure. As such, directional references should not be limited to specific coordinate orientations, distances, or sizes, but are used to describe relative positions referencing particular embodiments. Such terms are not generally limiting to the scope of the claims made herein. Any embodiment or feature of any section, portion, or any other component shown or particularly described in relation to various embodiments of similar sections, portions, or components herein may be interchangeably applied to any other similar embodiment or feature shown or described herein.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one embodiment" of the present disclosure are not intended to be interpreted as excluding the existence of additional embodiments that also incorporate the recited features.

In addition, it will be appreciated that while the Figures may show one or more embodiments of concepts or features together in a single embodiment of an environment, article, or component incorporating such concepts or features, such concepts or features are to be understood (unless otherwise specified) as independent of and separate from each other and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one", "one or more", and "and/or", as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

We claim:

1. A self-countersinking bone screw comprising:
 a distal end portion, an intermediate shaft portion, a neck portion, an enlarged head portion, an external thread, and one or more cutting flutes extending from the enlarged head portion towards the distal end portion;
 wherein:
  the enlarged head portion includes a distal end, a proximal end, and a concave outer surface extending from the distal end toward the proximal end;
  the neck portion includes a distal end and a proximal end, the neck portion configured to provide a transition from the shaft portion to the distal end of the enlarged head portion, the neck portion including a minor outer diameter that tapers from a minor outer diameter of the shaft portion towards the enlarged head portion;
  the one or more cutting flutes include a distal end and a proximal end, the distal end of the cutting flute being positioned closer to the distal end portion of the bone screw than the distal end of the neck portion so that, in use, the distal end of the one or more cutting flutes contacts a patient's bone prior to the distal end of the neck portion; and
  the neck portion includes an enlarged diameter thread, as measured from the minor outer diameter of an outer surface of the bone screw to a major diameter of the enlarged diameter thread, such that a height of the external thread in the neck portion is greater than a height of the external thread in the shaft portion.

2. The bone screw of claim 1, wherein the one or more cutting flutes extend parallel to a longitudinal axis of the bone screw.

3. The bone screw of claim 1, wherein the one or more cutting flutes are first and second diametrically opposed cutting flutes.

4. The bone screw of claim 1, wherein the neck portion includes a tapered outer surface arranged and configured so that the minor outer diameter of the neck portion is smaller adjacent to the shaft portion than the minor outer diameter of the neck portion adjacent to the enlarged head portion.

5. The bone screw of claim 4, wherein the tapered outer surface is configured as a linear taper.

6. The bone screw of claim 1, wherein the external thread is a continuous thread that extends from the distal end portion through the shaft portion and into the neck portion.

7. The bone screw of claim 1, wherein the distal end portion includes an increased diameter thread such that a height of the external thread in the distal end portion is greater than a height of the external thread in the shaft portion.

8. The bone screw of claim 1, wherein the distal end portion includes a tapered nose.

9. A method for countersinking a bone fastener to secure an intramedullary ("IM") nail within a patient's bone, the method comprising:
   implanting the IM nail within an intramedullary canal of a patient's bone;
   targeting a first screw opening formed in the implanted IM nail;
   predrilling a first screw hole in the patient's bone; and
   inserting a first bone screw into the first screw hole formed in the patient's bone and into the first screw opening formed in the IM nail;
   wherein inserting the first bone screw into the first screw hole comprises rotating a head portion of the first bone screw until the head portion of the bone screw is inserted to a depth sufficient such that an uppermost surface of the head portion is countersunk and wherein inserting the first bone screw into the first screw hole does not include pre-drilling a countersunk hole; and
   wherein the first bone screw comprises:
      a distal end portion, an intermediate shaft portion, a neck portion, an enlarged head portion, an external thread, and one or more cutting flutes extending from the enlarged head portion towards the distal end portion;
      the neck portion includes a distal end and a proximal end, the neck portion configured to provide a transition from the shaft portion to the enlarged head portion, the neck portion including a minor outer diameter that tapers from a minor outer diameter of the shaft portion towards the enlarged head portion;
      the one or more cutting flutes include a distal end and a proximal end, the distal end of the cutting flute being positioned closer to the distal end portion of the bone screw than the distal end of the neck portion so that, in use, the distal end of the one or more cutting flutes contacts a patient's bone prior to the distal end of the neck portion; and
   wherein the neck portion includes an enlarged diameter thread, as measured from the minor outer diameter of the neck portion to a major diameter of the enlarged diameter thread, such that a height of the external thread in the neck portion is greater than a height of the external thread in the shaft portion.

10. The method of claim 9, further comprising monitoring a position of the head portion of the first bone screw, and inserting the first bone screw until a proximal end of the head portion is positioned flush with an outer surface of the patient's bone.

11. The method of claim 9, wherein the one or more cutting flutes are arranged and configured to enlarge a diameter of the first screw hole formed in the patient's bone so that the enlarged head portion can be inserted to a depth sufficient such that an uppermost surface of the enlarged head portion is positioned beneath the outer surface of the patient's bone.

12. The method of claim 9, wherein inserting a first bone screw into the first screw hole formed in the patient's bone and into engagement with a first screw opening formed in the IM nail comprises coupling a guide to the IM nail, inserting a sleeve into the guide, and coupling the first bone screw to a screwdriver, the screwdriver including a plurality of markings or indicia to indicate a position of the enlarged head portion of the bone screw relative to the outer surface of the patient's bone.

13. The method of claim 12, wherein the plurality of markings or indicia include a first marking or indicia, a second marking or indicia, and a third marking or indicia.

14. The method of claim 13, wherein:
   the first marking or indicia is arranged and configured to indicate that the enlarged head portion of the bone screw is approaching the outer surface of the patient's bone;
   the second marking or indicia is arranged and configured to indicate that the enlarged head portion of the bone screw is in contact with the outer surface of the patient's bone; and
   the third marking or indicia is arranged and configured to indicate that the enlarged head portion of the bone screw is countersunk or at a penetration depth flush with the outer surface of the patient's bone.

15. The method of claim 9, wherein the enlarged head portion includes a distal end, a proximal end, and a concave outer surface extending from the distal end toward the proximal end.

\* \* \* \* \*